Patented May 14, 1940

2,200,582

UNITED STATES PATENT OFFICE 2,200,582

INSECTICIDE

Elbert M. Shelton, New Haven, Conn., assignor to The Tannin Corporation, New York, N. Y., a corporation of New York No Drawing. Application November 8, 1938, Serial No. 239,422

7 Claims. (Cl. 167—34)

This invention relates to insecticides, and has for its object the provision, as a new composition of matter, of an improved nicotine insecticide.

Nicotine has long been recognized as an effective insecticide. It is commonly used in the form of its sulphate as a contact insecticide. Other forms of nicotine, less water soluble than the sulphate, have also been used, to a limited extent, to afford sufficient duration of retention on the plant foliage to provide protection through stomach poison effect. Nicotine has, for example, been combined with tannic acid of nut-galls, by adding nicotine to an aqueous solution of tannic acid, to produce an insecticide spray containing less than 0.1% of nicotine. More recently, it has been proposed to produce a concentrated paste of nicotine tannate by combining nicotine and tannic acid in the presence of a protective colloid capable of retarding the reaction of the nicotine with the tannic acid. This product is bulky and because of its stickiness is not well adapted to be dried, and furthermore, of the total nicotine incorporated, less than half is in water-insoluble form.

The improved nicotine insecticide of the invention comprises the reaction product of nicotine, a vegetable tannin of the catechol class and an aldehyde. The product is capable of being readily dried and pulverized, and in its dry form contains a substantial percentage of nicotine, preferably at least 5% and up to 10% if desired. The nicotine appears to be combined with the condensation product, or resin, resulting from the reaction of the aldehyde with the vegetable tannin of the catechol class, and in this combination possesses a high degree of water insolubility.

Although a wide range of aldehydes may be used in preparing the improved insecticide of the invention, economic considerations naturally limit the selection to those such as formaldehyde and furfuraldehyde, available commercially at low cost. Likewise, although many catechol tannins exist and several are available commercially, the extract of quebracho wood yields this type of tannin at particularly low cost. Hence, it is my preferred practice to use quebracho extract in preparing insecticides of the invention, although it is to be understood that all tannins of the catechol class react with aldehydes to produce insoluble resins with which nicotine will combine. The nicotine may be added to the reaction mixture either before or after the formation of the insoluble resin resulting from the reaction of the aldehyde with the vegetable tannin of the catechol class. The following examples illustrate such alternative procedures for preparing insecticides of the invention.

I. Preparation of the aldehyde resin, followed by nicotine reaction

The preparation of the resin involves heating an aqueous solution of the tannin with an excess of the aldehyde. The reaction is facilitated by the presence of a strong acid, such as hydrochloric acid. For the purposes of this example, the resin was prepared from commercial quebracho extract and formaldehyde by the following procedure:

80 grams of commercial quebracho extract (liquid, containing approximately 35% quebracho tannin) were diluted with water to 720 grams, heating to bring all the extract into solution. 80 grams of formaldehyde solution (40%) were stirred in, followed by 20 grams of concentrated hydrochloric acid. Precipitation followed within a minute or two, but heating was continued half an hour to insure complete reaction. The bulky precipitate was then filtered out and rinsed with fresh water, freeing it from the large excess of aldehyde and from the acid. The filtrate and rinse water may be used in processing subsequent batches of tannin, so the excess reagents are not wasted. While the gelatinous precipitate may be made substantially free of acid by continued washing, I prefer to expedite the neutralization by adding to the third or fourth wash water small amounts of salts capable of buffer effect and tending to bring the pH of the mass between 6 and 8 at once.

Nicotine may now be combined with the wet resin most simply by passing an aqueous solution of nicotine through the mass, still on the filter, until the effluent liquid contains considerable nicotine, as may be shown by testing portions with a silicotungstic acid solution. The mass on the filter is rinsed with water to remove excess nicotine, such wash waters being saved to recover their nicotine content by leaching through the next batch of fresh resin. The crumbly mass on the filter is readily dried and pulverized without significant loss of nicotine by volatilization, and contains approximately 10% nicotine, based on its dry weight.

This foregoing procedure not only provides a fixed nicotine of high insolubility suitable for use as a stomach poison type of insecticide, but provides a practical means of recovering nicotine from dilute solutions. It involves the use of relatively large volumes of liquid in processing, and makes no use of the soluble non-tannins present in the original tannin-bearing extract. These non-tannins have been found to be of value as spreading agents during spraying, and although they tend to hold some nicotine in water-soluble form, their presence is generally desirable. Therefore, I prefer in practice a modification of this procedure, in which the nicotine is first mixed with tannin extract to produce a concentrated paste of nicotine tannate, following which the aldehyde is added (without acid, and without excess aldehyde) and the mixture is heated until the reaction mixture has become a solid. This solid is easily broken up, dried, and pulverized to a fine dust.

II. Resinification of nicotine tannate

A specially concentrated solution of tannin-bearing extract is prepared by dissolving 55 lbs. of solid quebracho extract in 23 lbs. of water and 13 lbs. of isopropyl alcohol. For this purpose it is advantageous to choose a quebracho extract in which the ratio of tannin to non-tannin is approximately 1. The non-tannin content of the quebracho extract provides a protective colloid which facilitates the subsequent mixing with nicotine. Into this thick paste is stirred 9 lbs. of 50% nicotine solution until well mixed, then 10 lbs. of formaldehyde solution (or 5 lbs. of furfuraldehyde) are added and the mixture is heated in a closed container at about 100° C. for two hours. If the reaction vessel is provided with a suitable outlet the alcohol vapors may be condensed and most of the alcohol recovered. When the reaction is complete the viscous paste will be found to have been changed to a solid mass, easily broken up, dried, and pulverized, yielding a dry solid of about 7% nicotine content.

The foregoing procedure may be modified by substituting wattle extract for quebracho, as well as by substituting (as indicated) furfuraldehyde for formaldehyde. I have found it possible, moreover, to substitute other solvents for the alcohol in making the concentrated tannin solution— notably urea, which not only facilitates the solution of the tannin in the water but later reacts with the aldehyde to contribute to the solidification and insolubilization of the mass.

This product readily lends itself to color control by incorporation of small additions of basic dyestuffs such as Victoria Green, Rhodamine, etc., with the mixture before solidification.

I have also found that it is not necessary to use free nicotine in mixing with the tannin-bearing extract, provided the final mixture is adjusted to a pH value in the range of 7 to 8 where I have found maximum combination of nicotine with tannin occurs. I have accordingly substituted nicotine sulfate in the reaction and supplied the alkalinity by controlled addition of sodium hydroxide or sodium sulfide, in the latter case incorporating some fungicidal value to the mixture.

The solid products prepared by any of these procedures may be applied either as dusts or dispersed in water for spraying. When applied as dusts it is preferable to reduce the nicotine content to 3 or 4%. The material added for this purpose may include stickers, such as soy bean flour, or a neutral fungicide such as finely divided sulfur, both of which I have found compatible with these nicotine dusts.

I claim:

1. As a new composition of matter, an insecticide comprising the reaction product of nicotine, a vegetable tannin of the catechol class and an aldehyde.

2. As a new composition of matter, an insecticide comprising the combination of nicotine with the resin resulting from the reaction of an aldehyde with a vegetable tannin of the catechol class.

3. As a new composition of matter, an insecticide comprising nicotine in combination with the reaction product of an aldehyde and a vegetable tannin extract of the catechol type including the non-tannin of the extraction.

4. As a new composition of matter, an insecticide comprising the reaction product of an aldehyde with a concentrated paste of nicotine tannate formed by combining nicotine and a vegetable tannin extract of the catechol class in the presence of a protective colloid.

5. As a new composition of matter, an insecticide comprising the reaction product of nicotine, quebracho extract in which the ratio of tannin to non-tannin is approximately 1 and an aldehyde.

6. As a new composition of matter, a dry insecticide comprising the reaction product of nicotine, a vegetable tannin of the catechol class and an aldehyde in which the nicotine content is at least 5% based on the dry weight of the composition.

7. As a new composition of matter, a dry insecticide comprising the reaction product of nicotine, a vegetable tannin of the catechol class and an aldehyde in which the nicotine content is from about 7 to 10% based on the dry weight of the composition.

ELBERT M. SHELTON.